United States Patent [19]

Petitcolas

[11] 4,345,111
[45] Aug. 17, 1982

[54] ELECTRIC CONDUCTING CABLE INSENSITIVE TO NUCLEAR RADIATION

[75] Inventor: Hubert Petitcolas, Sassenage, France

[73] Assignee: Commissariat a l'Energie Atomique, Paris, France

[21] Appl. No.: 167,671

[22] Filed: Jul. 11, 1980

[30] Foreign Application Priority Data

Jul. 12, 1979 [FR] France ................. 79 18123

[51] Int. Cl.$^3$ ............................................. H01B 7/18
[52] U.S. Cl. ........................... 174/102 A; 174/102 P; 174/110 A; 174/118; 174/36
[58] Field of Search ................. 174/35 TS, 36, 102 R, 174/102 A, 102 P, 106 R, 110 A, 118, 126 CP; 176/93 R; 250/518

[56] References Cited

U.S. PATENT DOCUMENTS

| | | | |
|---|---|---|---|
| 2,207,579 | 7/1940 | Carl | 174/102 P X |
| 3,909,555 | 9/1975 | Harris | 174/102 P |
| 3,971,880 | 7/1976 | Harris | 174/102 P X |

Primary Examiner—Volodymyr Y. Mayewsky

[57] ABSTRACT

Electrical conducting cable which is insensitive to nuclear radiation comprising at least one conductive core, at least one layer of an insulating substance surrounding said conductive core and at least one conductive sheath surrounding said insulating layer, wherein the diameter $\phi_D$ of the sheath, the diameter $\phi_B$ of the conductive core, the diameter of $\phi_C$ of the insulating layer are linked by the equation:

$$\frac{\phi_B^2}{\phi_D^2 - \phi_C^2} = \frac{F_2}{F_1} \cdot \frac{1}{360} \, 2 \arcsin \frac{2\phi_B}{\phi_D + \phi_C}$$

$F_1$ representing the $\beta^-$ radiation fraction from the core reaching the sheath, $F_2$ representing the $\beta^-$ radiation fraction from the sheath which reaches the core, the insulating substance being constituted by a mixture of at least two metal oxides.

7 Claims, 3 Drawing Figures

ELECTRIC CONDUCTING CABLE INSENSITIVE TO NUCLEAR RADIATION

BACKGROUND OF THE INVENTION

The present invention relates to an electric conducting cable which is insensitive to nuclear radiation. This invention more particularly applies in the case of nuclear reactors to the continuous measurement of different physical magnitudes, such as the flux of thermal or fast neutrons, the gamma radiation intensity, deformations, etc. Generally, these measurements are performed by means of probes which supply an electrical signal which must be transferred from the probe, which is sometimes submerged in the reactor core, to a measuring apparatus located in an external control room. The conducting cables used are often disturbed by strap or leakage currents or voltages and in particular in that part of the said cables located within the reactor core or very close to the latter under the influence of radiation emitted by the fuel, namely neutrons and deactivation $\beta$ rays, gamma rays and electrons emitted at the time of gamma radiation capture. These disturbances can be considerable, particularly if the irradiated length of the cable is relatively great or if the probe has a low sensitivity compared with that of the cable. Due to these disturbances it is virtually impossible to carry out certain measurements such as, for example, the continuous measurement of the fast neutron flux. The interfering signals resulting from these disturbances also make the detector unusable for a certain time when it is a question of performing measurements of fast transient phenomena which must be known in order to improve the safety of fast reactors. These stray or leakage currents and voltages often make it necessary to use detectors with a very large volume if it is desired to instantaneously measure the thermal neutron flux.

Various solutions have been envisaged for eliminating this excessive sensitivity of cables which transmit signals between measuring probes and measuring apparatus.

According to one of these solutions for obtaining a useful signal well above the noise produced in the cable involves increasing the detector sensitivity by increasing its dimensions. However, this solution cannot always be envisaged, particularly when the space necessary for housing this large detector is not available, which also disturbs the radiation field to be measured. Moreover, this solution which does not attack the cause of the interference, does not make it possible to develop detectors having a low relative sensitivity, for example for measuring fast neutron fluxes.

Another solution consists of using a bifilar shielded conducting cable. The two internal conductors are assumed to carry the same interfering current, one of the two conductors being connected to the detector, whilst the other which is the compensating conductor, is not connected thereto. By subtracting the signal of the compensation conductor from the signal produced by the detector and its connecting conductor, it is possible to become partly independent of the interfering signal produced in the cable. However, this solution is not perfect. Thus, it is more difficult and costly to measure two signals and to obtain the difference between them and to carry out a single measurement. Moreover, it is known that a magnitude obtained by subtracting two similar magnitudes can easily suffer from a very large relative error. Finally, it is very difficult and even impossible to manufacture a symmetrical, bifilar cable, so that the two conductors never supply the same interfering signal and uses are more likely to use two monofilar shielded cables rather than a single bifilar cable.

In the solution using two monofilar shielded cables, one is used for measurement and the other for compensation. This solution has the main disadvantage of doubling the number of measuring wires, which leads to the doubling of the overall dimensions, the number of sealed packages, etc, thus increasing the total cost of such measurements. This solution also requires the two cables to follow the same path in such a way that they are located in the same radiation fields. However, this constraint is not always respected, so that different interfering signals are produced in each of the monofilar cables. Finally, as in the case of the bifilar cable, it is necessary to perform the measurements by forming the difference, which leads to a very high relative error.

BRIEF SUMMARY OF THE INVENTION

The problem of the present invention is to obviate these disadvantages and in particular to produce an electrical conducting cable which is insensitive to nuclear radiation, which does not require, as is the case in the prior art solutions referred to hereinbefore, the use of a bifilar structure or of detectors having considerable overall dimensions. This problem is solved by the conducting cable according to the invention having a structure making it relatively insensitive to nuclear radiation and in particular to neutrons, gamma radiation and external electrons.

The invention therefore relates to an electrical conducting cable which is insensitive to nuclear radiation comprising at least one conductive core, at least one layer of an insulating substance surrounding said conductive core and at least one conductive sheath surrounding said insulating layer, wherein the diameter $\phi_D$ of the sheath, the diameter $\phi_B$ of the conductive core, the diameter of $\phi_C$ of the insulating layer are linked by the equation:

$$\frac{\phi_B^2}{\phi_D^2 - \phi_C^2} = \frac{F_2}{F_1} \cdot \frac{1}{360} 2 \text{ arc sin} \frac{2\phi_B}{\phi_D + \phi_C}$$

$F_1$ representing the $\beta^-$ radiation fraction from the core which reaches the sheath, $F_2$ representing the $\beta^-$ radiation fraction from the sheath which reaches the core, the insulating substance being constituted by a mixture of at least two metal oxides.

According to another feature of the invention, the sheath and the core are made from metals or metal alloys, each having an atomic number which is equal to or below 40 and a limited neutron absorption cross-section.

According to another feature, one or some of the metal elements of the metal oxides constituting the insulating layer have a lower atomic number than the sheath and the core, whilst the other or others of said metal elements have a higher atomic number than that of the sheath and core.

According to another feature, the insulating substance has a small neutron absorption cross-section.

According to another feature, the sheath and core are made from stainless steel with a low manganese content.

According to another feature of the invention, the electrically insulating substance comprises two metal oxides chosen from the following list: $M_gO$, $Al_2O_3$, $BeO$, $SrO$, $NbO$, $ZrO_2$.

According to another feature, a zirconium oversheathing layer is placed between the core and the insulating layer.

BRIEF DESCRIPTION OF THE DRAWINGS

The invention is described in greater detail hereinafter relative to non-limitative embodiments of the invention and the attached drawings, wherein show.

DETAILED DESCRIPTION OF THE PREFERRED EMBODIMENTS

Figure 1:
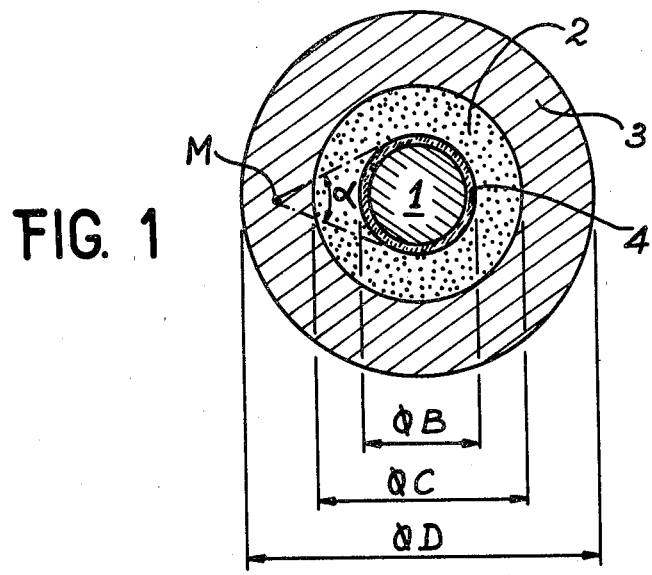
FIG. 1 in cross-section a cable according to the invention.

FIG. 1 shows a coaxial cable according to the invention comprising at least one conductive core 1, at least one layer 2 of an insulating substance surrounding said conductive core and at least one conductive sheath 3 surrounding said insulating layer. In order to reduce the sensitivity of the cable to nuclear radiation, as will be seen hereinafter, it is possible to introduce a metallic oversheathing layer 4 between the conductive core 1 and the insulating layer 2.

If $\phi_B$, $\phi_C$, $\phi_D$ are used to designate the respective diameters of conductive core 1, insulating layer 2 and sheath 3, for the thus constituted cable to be insensitive to nuclear radiation, it is necessary, as will be seen hereinafter, to respect the following equation:

$$\frac{\phi_A^2}{\phi_D^2 - \phi_C^2} = \frac{F_2}{F_1} \cdot \frac{1}{360} \cdot 2 \arcsin \frac{2\phi_B}{\phi_D \phi_C}$$

In this equation, $F_1$ represents the $\beta^-$ fraction from core 1, which reaches sheath 3, corresponding to the transmission of the traversed media before reaching the sheath (as will be seen hereinafter this is in particular the case with the insulating substance constituting layer 2 which is formed by a mixture of at least two metal oxides). The $\beta^-$ radiation fraction from sheath 3 which reaches core 1 is approximately equal to $F_2 \times (\alpha)/(360,)$ $F_2$ being also the transmission of the traversed media before reaching the core and $\alpha$, the average angle at which the conductive core 1 is seen from a point M located at mid-thickness of sheath 3. In order to balance out the $\beta^-$ radiation from the core to the sheath and from the sheath to the core, it is necessary for the source volumes Va and Vg which emit said radiation from the core or from the sheath to obey the following equation:

$$\frac{Va}{Vg} = \frac{F_2}{F_1} \cdot \frac{\alpha}{360}$$

If $\alpha$ is designated as a function of the core diameter and of the average sheath diameter, we obtain:

$$\sin \frac{\alpha}{2} = \frac{\frac{\phi_B}{\phi_D + \phi_C}}{2}$$

and from this is obtained:

$$\alpha = 2 \arcsin \frac{2\phi_B}{\phi_D + \phi_C}.$$

It is also possible to express the source volume Va as a function of the core diameter and the considered length h of said core exposed to radiation and to express the source volume Vg of the sheath as a function of the external diameter $\phi_D$ and internal diameter $\phi_C$ of said sheath and of the considered length h thereof along the cable:

$$Va = \frac{\pi}{4} \cdot \phi_B^2 \times h;\ vg = \frac{\pi}{4}(\phi_D^2 - \phi_C^2) \cdot h.$$

Thus, $\frac{Va}{Vg} = \frac{\phi_B^2}{\phi_D^2 - \phi_C^2} = \frac{F_2}{F_1} \cdot \frac{\alpha}{360}$ from which we obtain $\frac{\phi_B^2}{\phi_D^2 - \phi_C^2} =$ $$\frac{F_2}{F_1} \cdot \frac{1}{360} \cdot 2 \arcsin \frac{2\phi_B}{\phi_D + \phi_C}.$$

The dimensions of the core, the insulating layer and the sheath must obey this equation in order to bring about compensation between the $\beta^-$ radiation from the core to the sheath and from the sheath to the core. These dimensions also bring about a reduction in the sensitivity of the cable to neutrons. The inner oversheathing constituted by the metal sheath 4 surrounding conductive core 1 makes it possible to reduce the sensitivity of the cable to below energy gamma radiation.

Figure 2:
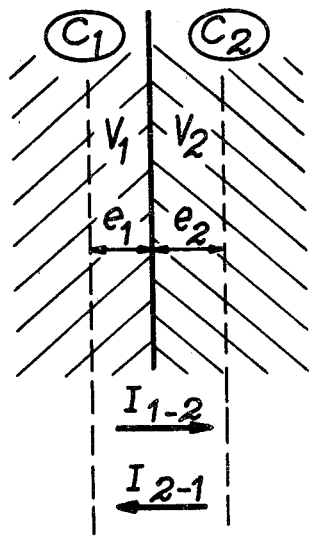
FIG. 2 two layers of different materials exposed to radiation and in which circulate the resulting currents.

As indicated hereinbefore, the cable geometry is very important for making the latter insensitive to nuclear radiation. With reference to FIG. 2, it will now be shown that the nature of the materials used is also very important for reducing this sensitivity, particular to gamma radiation. FIG. 2 shows two layers $C_1$, $C_2$ of different materials, exposed for example to gamma radiation. It is known that the secondary electrons which participate in the formation of stray currents under the influence of gamma radiation have energy levels equal to or below those of the said radiation and which consequently have small paths in the material. As the path of the electrons is small, under the influence of gamma radiation, only a thin layer of material $C_1$ can transmit electrons into material $C_2$, thus creating a current $I_{1-2}$ and conversely for material $C_2$ which transmits electrons into material $C_1$ creating a current $I_{2-1}$.

Current $I_{1-2}$ transmitted from material $C_1$ to material $C_2$ is proportional to the volume $V_1$ of body $C_1$ from which electrons can be transmitted to materials $C_2$. This volume $V_1$ is expressed in the equation: $V_1 = S_{1-2} \cdot e_1$. In this equation, $S_{1-2}$ is the surface of the material $C_1$ facing material $C_2$ and $e_1$ is the thickness of material $C_1$ which can be traversed by the electrons. This thickness is proportional to the value $R_{(E)}$ of the electrons of energy E and is inversely proportional to the ratio Z/A of the material $C_1$, as well as to the density $\rho 1$ of material $C_1$. Z designates the atomic number of the material in question, whilst A designates its atomic mass. It is therefore possible to write:

$$I_{1-2} = k_1 R_{(E)} \cdot S_{1-2} \cdot \frac{1}{\rho 1} \left( \frac{A}{Z} \right)$$

This equation is applicable to the case of monoenergetic electrons of energy E.

The current $I_{1-2}$ is also proportional to the probability $\mu$ of photoelectric and Compton events in volume $V_1$. Thus, it is also possible to write:

$$\mu = \frac{\mu(E)}{\rho} \rho 1$$

In this equation, $\mu(E)/\rho$ is the absorption coefficient in $cm^2/g$, which varies greatly with the nature of the materials and the energy of the gamma radiation. It is then possible to write:

$$I_{1-2} = K_1 \cdot R_{(E)} \cdot S_{1-2} \left( \frac{\mu(E)}{\rho} \right) \cdot \frac{A}{Z}$$

Finally, the current $I_{1-2}$ transmitted from material $C_1$ to material $C_2$ is proportional to the flux $\psi(E)$ of the gamma radiation of energy E.

Figure 3:
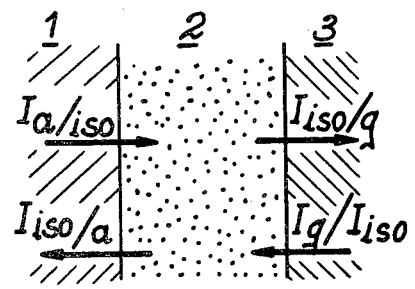
FIG. 3 diagrammaticaly, the current circulating in the core, insulating layer and cable sheath of FIG. 1 when exposed to radiation.

FIG. 3 diagrammatically shows the superimposition of conductive core 1, electrical insulation 2 and sheath 3. In FIG. 3, arrows designate the current $I_a$/iso which circulates from the core to the insulation, the current $I_{iso}$/a circulating from the insulation to the core, current $I_{iso}$/g circulating from the insulation to the core and current $I_g$/iso circulating from sheath to the insulation.

It is then possible to write, within a proportionality coefficient $K_2$ that the total balance of the current circulating in the cable as a result of the influence thereon of $\beta$ radiation is equal to:

$$I = K_2 (I_a/\text{iso} - I_{iso}/a + I_{iso}/g - I_g/\text{iso})$$

or $I =$ $$K_{(E)}\psi_{(E)}R_{(E)} \left[ \left( \phi_A \frac{\mu(E)}{\rho} \cdot \frac{A}{Z} \right)_a - \left( \phi_A \frac{\mu(E)}{\rho} \cdot \frac{A}{Z} \right)_{iso} + \left( \phi_g \frac{\mu(E)}{\rho} \cdot \frac{A}{Z} \right)_{iso} - \left( \phi_g \frac{\mu(E)}{\rho} \cdot \frac{A}{Z} \right)_g \right]$$

In the above expression, $\phi_A$ designates the external diameter of the core, whilst $\phi_g$ designates the internal diameter of the sheath. The first term contained in parenthesis is relative to the material forming the core, the second and third terms relate to the materials forming the insulation, whilst the fourth term relates to the material forming the sheath.

On writing:

$$\phi_A \left( \frac{\mu(E)}{\rho} \cdot \frac{A}{Z} \right)_a - \left( \phi_A \frac{\mu(E)}{\rho} \cdot \frac{A}{Z} \right)_{iso} +$$

$$\left( \phi_g \frac{\mu(E)}{\rho} \cdot \frac{A}{Z} \right)_{iso} - \left( \phi_g \frac{\mu(E)}{\rho} \cdot \frac{A}{Z} \right)_g =$$

$H(E, Z_i, \phi_i)$, it is possible to write: $I =$

-continued $$\int_0^\infty K_{(E)}\psi_{(E)}R_{(E)}[H_{(E)}, Z_i, \phi_i] dE$$

To reduce the sensitivity of the conductor to gamma radiation, this expression must have a value which is as close as possible to zero.

To minimize this expression, it is possible to minimize the term H (E, $Z_i$, $\phi_i$) by using materials having a low atomic number. It is also necessary for the materials constituting the core, insulation and sheath to have atomic numbers which are as close to one another as possible in order to reduce the residual differential sensitivity.

An advantageous material for forming the sheath and conductive core (which must be durable, ductile and resistant to high temperatures) is stainless steel, all of whose constituents have an atomic number below 40. It is advantageous for the insulation to comprise two metal oxides selected from the list: MgO, $Al_2O_3$, BeO, SrO, NbO, $ZrO_2$. However, it is pointed out that in a coaxial cable the inner surface of the sheath is necessarily larger than the outer surface of the core. Therefore, more electrons pass from the sheath to the core than in the other direction. This negative sensitivity must be eliminated and for this purpose it is possible to choose from among a number of solutions. One of these consists of oversheathing the conductive core with a layer of material having a high atomic number with a low sensitivity to neutrons, whereby said layer can be zirconium (layer 4 in FIG. 1). The oversheathing material also has the advantage of having a large gamma radiation absorption cross-section. Finally, it is also possible to reduce the residual sensitivity of the cable to gamma radiation by a well metered mixture between two of the electrically insulating substances referred to hereinbefore and which respectively have lower and higher atomic numbers than the core and the sheath (which are e.g. of stainless steel). The latter solution tends to cancel out the expression H(E, $Z_i$, $\phi_i$) referred to hereinbefore.

As stated hereinbefore, the most frequently used metal oxides for making the insulating layer are MgO, $Al_2O_3$, BeO, SrO, NbO, $ZrO_2$. These oxides make it possible to reduce the sensitivity to thermal neutrons, because they have small $\sigma_c$ and $\sigma_{act}$ absorption and activation cross-sections. This is of interest, because the neutron capture gamma particles produce displacements of electrons from the core to the sheath or vice versa by photoelectric or Compton effect. The same phenomenon occurs with the deactivation $\beta^-$ particles. These displacements of electrons or $\beta^-$ particles constitute instantaneous interference and the use of materials having low effective cross-sections is an important condition.

Magnesia MgO has the following effective cross-sections: $\sigma_c = 57$ mb(millibarns) and $\sigma_{act} = 3$ mb. Alumina ($Al_2O_3$) can also be used and have the effective cross-sections $\sigma_{act} = 235$ mb. It has the advantage of a very high temperature resistivity. Silica ($SiO_2$) has as effective cross-sections $\sigma_c = 91$ mb and $\sigma_{act} = 3.4$ mb. Strontium oxide (SrO) has as effective cross-sections $\sigma_c = 140$ mb and $\sigma_{act} = 5$ mb. Finally, it is also possible to use zirconium dioxide ($ZrO_2$) or niobium oxide (NbO), beryllia or beryllium oxide (BeO) having as the effective cross-section $\sigma_c = \sigma_{act} = 9$ mb which are negligible. Therefore, beryllium oxide is of great interest due to its limited sensitivity to neutrons.

The sheath and core can be made from stainless steel. Thus, for example, a stainless steel contains 70% iron, 18% chrome, 10% nickel and 1 to 2% manganese would have the effective cross-section $\sigma_c=31.4$(barns) and $\sigma_{act}=205$ mb. However, in the case of a steel containing less than 0.1% manganese these figures would be $\sigma_c=2.88$ b and $\sigma_{act}=5.74$ mb. It is therefore of particular interest to use for the conductive core and sheath a stainless steel with a particularly low manganese content.

The electrical conducting cable with a limited sensitivity to nuclear radiation described hereinbefore makes it possible to improve nuclear physics measurements performed with detectors. It also gives independence from the use of compensated bifilar cables associated with costly differential measurement apparatuses. Moreover, it makes it possible to perform measurements in power nuclear reactors with a low signal (from the detector) to noise (from the cable) ratio and to reduce the dead time (particularly in measurements of transient phenomena).

Thus, for example, a cable according to the invention has been produced, whose insulation comprises a mixture of two materials with atomic numbers respectively below and above that of the sheath. The internal conductor is stainless steel containing a minimum of manganese e.g. 0.09%. The insulation is for example constituted by 50% by weight MgO and 50% by weight SrO (or $ZrO_2$). This insulation has an internal diameter of 0.375 mm and an external diameter of 0.7 mm.

The external sheath is of stainless steel, which is the same as that used for the internal conductor having an internal diameter of 0.7 mm and an external diameter of 1.2 mm.

The dimensions given in an exemplified manner hereinbefore can undergo relative adjustment (e.g. approximately 20%) and large absolute variations (e.g. up to a factor of 4). The percentages can also be adjusted (e.g. ±30%).

What is claimed is:

1. An electrical conducting cable which is insensitive to nuclear radiation comprising at least one electrically conductive core, at least one layer of an electrically insulating substance surrounding said conductive core and at least one electrically conductive sheath surrounding said insulating layer, wherein the diameter $\phi_D$ of the sheath, the diameter $\phi_B$ of the conductive core, the diameter of $\phi_C$ of the insulating layer are linked by the equation:

$$\frac{\phi_B^2}{\phi_D^2 - \phi_C^2} = \frac{F_2}{F_1} \cdot \frac{1}{360} 2 \arcsin \frac{2\phi_B}{\phi_D + \phi_C}$$

$F_1$ representing the $\beta^-$ radiation fraction from the core which reaches the sheath, $F_2$ representing the $\beta^-$ radiation fraction from the sheath which reaches the core, the insulating substance being constituted by a mixture of at least two metal oxides.

2. A cable according to claim 1, wherein the sheath and core are made from at least one metal having an atomic number which is below or equal to 40 and a low neutron absorption cross-section.

3. A cable according to claims 1 or 2, wherein at least one of the metal oxides constituting the insulating layer has a low atomic number than the sheath and the core, whilst at least the other has a higher atomic number than the sheath and core.

4. A cable according to claim 3, wherein the insulating substance has a low neutron absorption cross-section.

5. A cable according to claim 4, wherein the sheath and core are made from stainless steel with a low manganese content.

6. A cable according to claim 1, wherein the insulating substance is made from two metal oxides selected from the following: MgO, $Al_2O_3$, BeO, SrO, NbO, $ZrO_2$.

7. A cable according to claim 6, wherein a zirconium oversheathing layer is placed between the core and the insulating layer.

* * * * *